May 26, 1925.
E. A. SHANK
FOLDING TIRE DISPLAY HOLDER
Filed May 1, 1924
1,539,519
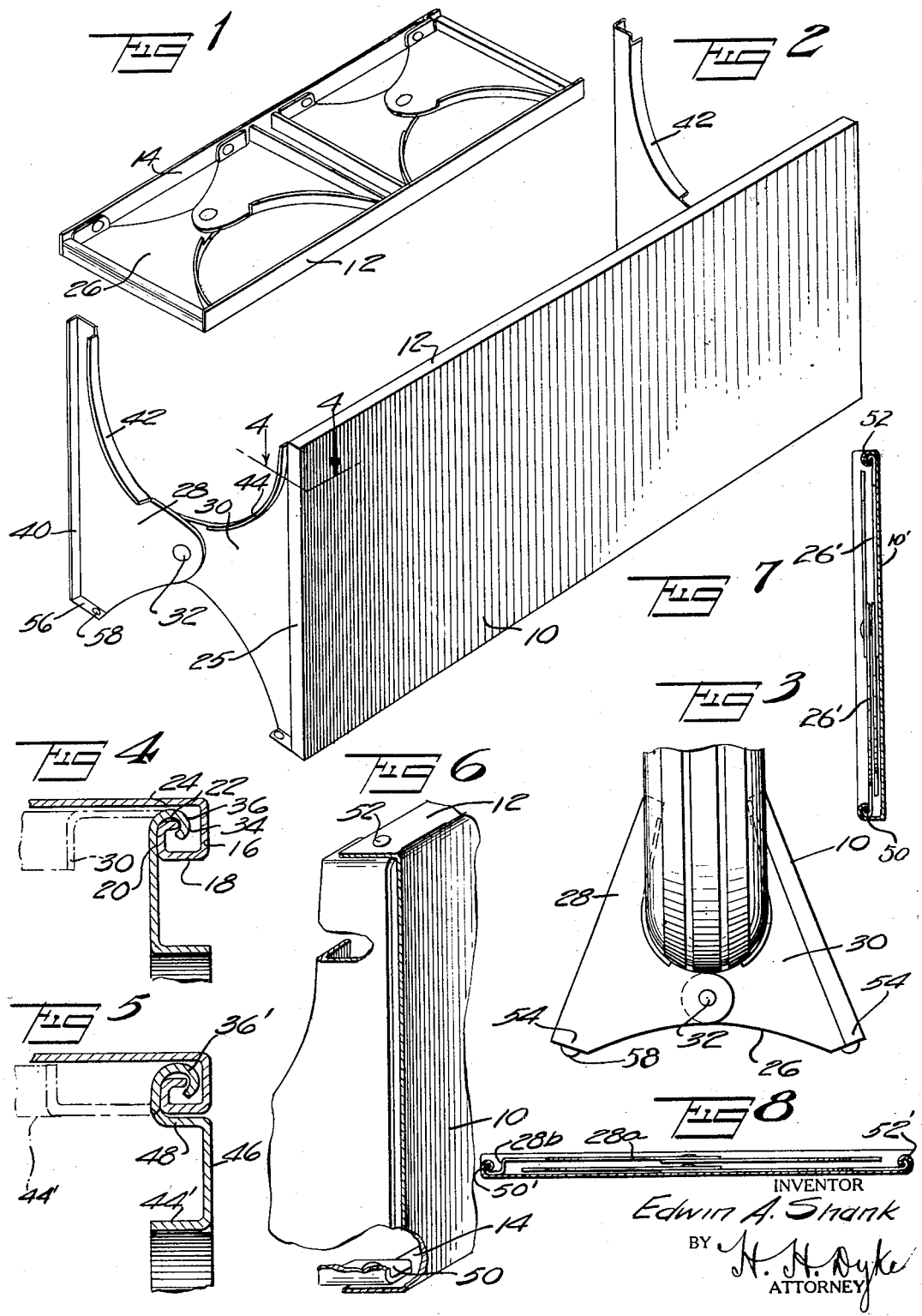

Patented May 26, 1925.

1,539,519

UNITED STATES PATENT OFFICE.

EDWIN A. SHANK, OF BROOKLYN, NEW YORK.

FOLDING TIRE-DISPLAY HOLDER.

Application filed May 1, 1924. Serial No. 710,228.

*To all whom it may concern:*

Be it known that I, EDWIN A. SHANK, a citizen of the United States, and a resident of the borough of Brooklyn, city of New York, county of Kings, and State of New York, have invented a certain new and useful Improvement in Folding Tire-Display Holders, of which the following is a specification.

My invention relates to a folding tire holder for displaying annular articles, such as automobile tires. The tire holder of the present invention can be folded or collapsed to lie flat for shipping and storage, and can be put into use for display support of tires by merely unfolding it, without requiring any assembly operation, such as insertion of any screws or other fastening devices of any kind, and without the use of any tools.

The holder is preferably made of sheet metal to secure the requisite strength and lightness. In the preferred form the device comprises merely a plate or panel adapted for reception and display of advertising matter and having pivotally secured thereto at each end, so as to be folded inwardly or to extend away from the panel at substantially a right angle, one of the members of a two part tire support, to which in turn is pivoted the second member of the tire support, each of the two-part tire supports having a total length which is preferably about half or less than half the length of the panel, so that they can be folded toward one another and against the panel without overlapping at their adjacent ends, though if desired the supports may be made somewhat longer than this or the panel shortened, in which case the supports will overlap when the holder is folded up.

In Fig. 1 of the drawings, the holder is shown folded. In Fig. 2 it is shown set up ready to receive, hold and display a tire. Fig. 3 is an end view of the holder with a tire in place. Fig. 4 is a section on the line 4—4, Fig. 2. Fig. 5 is a similar section, but showing a modification with inwardly directed tire support flanges. Fig. 6 shows a further modification in which the tire supports are pivotally connected to the panel with rivets, the end of the panel being cut away in order to permit illustration of the pivoting arrangement. Fig. 7 is a longitudinal section of a still further modification in which the panel is made relatively short and the supports overlap when folded. Fig. 8 is similar to Fig. 7, except for an offset in that support furthest from the face.

The sheet metal panel 10, which serves for an advertising surface and as a connector for the tire supports, has top and bottom flanges 12 and 14. Where the pivotal connection between the tire supports and the panel is in the form of a rolled together sheet metal seam or joint, as in all the views except Fig. 6, the ends of panel 10 have end flanges originally somewhat wider than the top and bottom flanges, and which are rolled or turned inwardly as indicated at 16, 18, 20 and 22, leaving a narrow opening 24 adjacent to the back of the panel. The roll which is designated generally by reference character 25 may be made of other forms as round, instead of square sided, if desired.

The tire supports indicated generally by reference character 26 are in two parts 28, 30 pivotally connected at 32, and one of them has its margin 34 extending through slot 24 and rolled into roll 25, as indicated at 36. It will be apparent that the holders can be folded flat into the position of Fig. 1 and as shown in dotted lines in Fig. 4. Instead of attaching the supports to the panel by a rolled together pivotal connection, they may be formed separately and the turned over part of the supports slipped endwise into the turned over part of the panel end flanges, prior to the formation of the top and bottom flanges on the panel, and when the panel is afterwards flanged on top and bottom these flanges serve to keep the support connections in place.

With the form of Figs. 1–4 the marginal flange 40 and the tire supporting flanges 42, 44 are indicated as extending outwardly. When it is desired to direct such flanges inwardly the rolled in or hooked portion 36' is offset from the general plane 46 of the tire holding member by the offsetting flange part 48, Fig. 5. With such arrangement the flanges of the tire holders as 44 may be reversed and directed inwardly, taking the position when folded as shown in dotted lines in Fig. 5. With such arrangement, when the holders are opened out for use with the flanges of the tire holders directed inwardly, the holders present a smooth and pleasing exterior and avoid objections present with projecting flanges, such as the catching of clothing thereon, etc.

Instead of the rolled together or endwise inserted pivotal joint, other forms of pivotal connection may be resorted to, as, for example, the holders may be pivoted to the panel 10 by being loosely riveted to the top and bottom flanges of the panel, as indicated at 50, 52, Fig. 6.

The tire supports are preferably cut away on their lower ends, except at the outer corners 54, so as to afford a broad extensive footing and to prevent overturning. A portion of their bottom flanges 56 is preferably bumped outwardly, as indicated at 58, to provide rounded feet or domes, which enable the device to be placed and moved about on a table, counter or show window floor without scratching or injuring the surface on which the device is placed.

A very cheap and simple form of holder in accordance with my invention may be produced by making the panel 10' relatively short as shown in Fig. 7, making the supports 26' flat and without the tire engaging flanges, and folding same in to lap over one another by making the pivotal connection at one end of the panel, as 50, to extend somewhat further away from the panel than the pivotal connection 52 at the other end.

If, however, the outer support 28ª is offset, as shown at 28ᵇ, Fig. 8, flanges 50', 52' at the ends of the panel are both of the same width.

It will be seen that the improved holder has many features of advantage. It is simply and cheaply constructed of inexpensive material, the construction is entirely completed at the time of manufacture, leaving no screws or other separate parts to be put in by the user and which would have to be packed separately and may be lost or mislaid, it folds flat for shipping and storage or when temporarily out of use, when set up by merely being unfolded is ready for use, and in use affords a broad base, which is substantially proof against overturning and against scratching or marring of any support on which the holder is placed. The broad base because of its long lever arm also exerts added pressure on the tire being displayed, thereby holding it rigidly in place.

I claim:

1. In a sheet metal tire holder, a marginally flanged panel, two tire supports, each made in two parts pivotally connected together and one of the parts of each of said tire supports having a folding pivotal connection with the panel at the end of the panel, whereby the supports may be folded flat on the panel and are ready for use directly upon being unfolded.

2. In a display tire holder, a flanged panel, two tire supports each comprising two members pivotally connected together, and each tire support being of a length not in excess of half the length of the panel, and one of the support forming members of each tire support being pivotally connected to the flanges of the panel at each end thereof to fold inwardly toward one another against the panel and within the height of the panel flanges.

In testimony whereof, I have signed my name hereto.

EDWIN A. SHANK.